United States Patent
Ren et al.

(10) Patent No.: US 8,942,856 B2
(45) Date of Patent: Jan. 27, 2015

(54) POWER CONVERTER AND METHODS OF CONTROLLING THE SAME

(75) Inventors: Wei Ren, Niskayuna, NY (US); Robert William Delmerico, Clifton Park, NY (US); Kathleen Ann O'Brien, Niskayuna, NY (US); Yan Pan, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 473 days.

(21) Appl. No.: 13/334,383

(22) Filed: Dec. 22, 2011

(65) Prior Publication Data

US 2013/0166090 A1   Jun. 27, 2013

(51) Int. Cl.
*G06F 19/00* (2011.01)
*H02M 7/44* (2006.01)

(52) U.S. Cl.
USPC .......................................... 700/297; 702/64

(58) Field of Classification Search
CPC ....... Y02E 40/30; Y02E 60/728; H02M 7/44; H02J 3/18; H02J 3/24; H02J 13/0006; Y04S 10/22; Y04S 10/265
USPC ........ 700/297; 702/57, 60, 61, 62, 64, 65, 72, 702/187; 307/102, 103
See application file for complete search history.

(56) References Cited

U.S. PATENT DOCUMENTS

| | | | |
|---|---|---|---|
| 6,476,521 B1* | 11/2002 | Lof et al. | 307/105 |
| 7,031,859 B2* | 4/2006 | Piesinger | 702/72 |
| 7,444,248 B2* | 10/2008 | Premerlani et al. | 702/64 |
| 7,630,863 B2* | 12/2009 | Zweigle et al. | 702/188 |
| 7,755,371 B2* | 7/2010 | Wells | 324/713 |
| 7,945,401 B2* | 5/2011 | Bowdry et al. | 702/60 |
| 7,973,427 B2* | 7/2011 | Korba et al. | 307/43 |
| 8,659,186 B2* | 2/2014 | Teichmann et al. | 307/58 |
| 2006/0247874 A1* | 11/2006 | Premerlani et al. | 702/64 |
| 2008/0071482 A1* | 3/2008 | Zweigle et al. | 702/62 |

(Continued)

FOREIGN PATENT DOCUMENTS

EP   1830447 A1   9/2007
EP   1134867 B1   1/2009

OTHER PUBLICATIONS

Schweitzer et al, Snychrophasor-Based Power System Protection and Control Applications, Schweitzer Engineering Laboratories, Inc., 10 pages.

(Continued)

*Primary Examiner* — Charles Kasenge
(74) *Attorney, Agent, or Firm* — Paul J. DiConza

(57) ABSTRACT

A power delivery system includes at least one conductor having a first end and a second end and a phasor measurement unit (PMU) coupled to the first end of the conductor. The PMU is configured to obtain phasor data at the first end and generate a phasor signal that includes the phasor data. The power delivery system also includes a power generation system coupled to the second end of the conductor and configured to provide power to the conductor. The power generation system includes a power source, a power converter, and a controller. The controller is communicatively coupled to the PMU and is configured to receive the phasor signal and control the power converter based at least partially on the phasor data.

14 Claims, 2 Drawing Sheets

(56) References Cited

U.S. PATENT DOCUMENTS

| | | | |
|---|---|---|---|
| 2008/0204054 A1* | 8/2008 | Wells | 324/713 |
| 2009/0079267 A1* | 3/2009 | Korba et al. | 307/102 |
| 2009/0088990 A1* | 4/2009 | Schweitzer et al. | 702/58 |
| 2009/0326731 A1* | 12/2009 | Bowdry et al. | 700/297 |
| 2011/0172938 A1* | 7/2011 | Gu et al. | 702/62 |
| 2012/0065803 A1* | 3/2012 | Teichmann et al. | 700/297 |

OTHER PUBLICATIONS

International Search Report and Written Opinion issued in connection with corresponding PCT Application No. PCT/US2012/070073 dated Nov. 22, 2013.

PCT Invitation to Pay Additional Fees dated Aug. 29, 2013 from corresponding Application No. PCT/US2012/070073.

* cited by examiner

POWER CONVERTER AND METHODS OF CONTROLLING THE SAME

BACKGROUND OF THE INVENTION

The embodiments described herein relate generally to operating a power generation system, and more specifically, to using data obtained from a phasor measurement unit (PMU) to control the power generation system.

Solar and wind are examples of renewable sources of energy that are increasingly becoming attractive alternative sources of energy. Solar energy in the form of sunlight may be converted to electrical energy by solar cells. A more general term for devices that convert light directly into electrical energy is "photovoltaic cells." Solar farms include a plurality of solar cells coupled together to provide a desired level of power. Wind energy may be converted to electrical energy using a wind turbine generator. Wind turbine generators typically include a rotor having multiple blades that transform wind energy into rotational motion of a drive shaft, which in turn is utilized to drive an electric generator. Wind farms include a plurality of wind turbine generators coupled together to provide a desired level of power.

Power generated by an electric utility, using renewable sources of energy or fossil fuel based sources of energy, is typically delivered to a customer over an electrical grid. Generated power may be provided to power electronics, for example, a power converter, for conditioning of the power prior to application to the electrical grid. Electricity applied to the electrical grid is required to meet grid connectivity expectations. These requirements address safety issues as well as power quality concerns. For example, the grid connectivity expectations include operating the power generation system during a transient grid event, for example, a short circuit fault on the electrical grid. This capability may be referred to as low voltage ride through (LVRT) or zero voltage ride through (ZVRT). An LVRT/ZVRT event is a condition where the alternating current (AC) utility voltage is low on either one phase of the electrical grid or multiple phases of the electrical grid. During an LVRT/ZVRT event, the capacity of the electrical grid to accept power from the power generation system is low. Another grid connectivity expectation is that the generation system outputs match the voltage and frequency of the electricity flowing through the electrical grid.

The remote location and high power rating of typical renewable energy farms typically cause a weak grid connection unless high-value investment is applied to enhance the connection, for example, through inclusion of larger transmission lines and/or circuit compensation equipment. A low short-circuit ratio (SCR) is an indication that the grid is weak. For example, when the SCR is below 1.5, a traditional current controlled type of generator may not be able to operate stably and a voltage controlled type of generator has to be tuned relatively slow to operate stably. To operate the generator with the slow control an additional hardware investment is needed to assure enough operation margin (e.g., the size of a DC link capacitor included within the power converter may need to increase).

Furthermore, typically, electric generators having high power ratings are included within a renewable energy farm to allow the farm to ride through a fault event and avoid post-fault load shedding or blackout. However, during a low-voltage and especially a zero-voltage fault event, keeping synchronized with the grid voltage is difficult because the measured grid reference voltage typically used to maintain synchronization between an electric generator and the grid is low. If a fault event is severe, there may not be enough residual grid voltage for a controller to use as a reference. In this circumstance, the generator controller may independently determine a frequency at which to output power, which may be out of step with the grid. If during a recovery from a fault event the generators are out of step with the grid, a detrimentally large transient current may occur due to the phase angle difference between the generators and the grid.

BRIEF DESCRIPTION OF THE INVENTION

In one aspect, a power delivery system is provided. The power delivery system includes at least one conductor having a first end and a second end and a phasor measurement unit (PMU) coupled to the first end of the conductor. The PMU is configured to obtain phasor data at the first end and generate a phasor signal that includes the phasor data. The power delivery system also includes a power generation system coupled to the second end of the conductor and configured to provide power to the conductor. The power generation system includes a power source, a power converter, and a controller. The controller is communicatively coupled to the PMU and is configured to receive the phasor signal and control the power converter based at least partially on the phasor data.

In another aspect, a method for controlling at least one power converter configured to provide power to an electrical grid through a transmission line is provided. The method includes monitoring a voltage output of the power converter and recording voltage output data associated with the voltage output. The method also includes receiving a time reference signal and assigning a time-stamp to the voltage output data. The method also includes measuring a voltage phasor at a first location located at an opposite end of the transmission line from the power converter. The method also includes receiving the time reference signal and associating the time reference signal with the voltage phasor to generate phasor data. The method also includes transmitting the phasor data to a power converter controller and controlling, using the power converter controller, the power converter based at least partially on the phasor data and the voltage output data.

In yet another aspect, a controller configured to control a power converter coupled to a transmission line is provided. The power converter controller includes a global positioning device (GPS) receiver configured to receive a time reference signal and a memory device configured to store voltage output data associated with a voltage output of the power converter. The power converter controller also includes a processing device configured to assign a time reference to the voltage output data stored in the memory device. The processing device is also configured to receive phasor data from a phasor measurement unit (PMU) positioned at an opposite end of the transmission line from the power converter. The phasor data includes a time reference stamp tying the phasor data to a corresponding time of measurement. The processing device is also configured to compare the phasor data and voltage output data having the same time stamp and to control operation of the power converter based at least partially on the phasor data and the voltage output data.

DETAILED DESCRIPTION OF THE INVENTION

The methods, systems, and computer readable media described herein facilitate using data collected from a phasor measurement unit (PMU) to control a renewable energy based power generation system. More specifically, phasor data received from a remote PMU is used by a power generation system controller to maintain synchronization between the power generation system and the electrical grid. The synchronization is maintained as the power generation system rides through a grid event or provides power to an electrical grid having a prolonged grid voltage sag. Moreover, power generation system operation is based on current system information from the remote PMU. For example, converter operating parameters may be tuned based on current system information. The methods, systems, and computer readable media described herein also facilitate determining an actual impedance of the electrical grid and controlling the output power of the power generation system based on the actual grid voltage.

Technical effects of the methods and systems described herein include at least one of: (a) monitoring a voltage output of at least one power converter; (b) recording voltage output data associated with the voltage output of the power converter; (c) receiving a time reference signal and assigning a time-stamp to the voltage output data; (d) measuring a voltage phasor at a first location, the first location positioned at an opposite end of a transmission line from the power converter; (e) receiving the time reference signal and associating the time reference signal with the voltage phasor to generate phasor data; (f) transmitting the phasor data to a power converter controller; and (g) controlling, using the power converter controller, the power converter based at least partially on the phasor data and the voltage output data.

Figure 1:
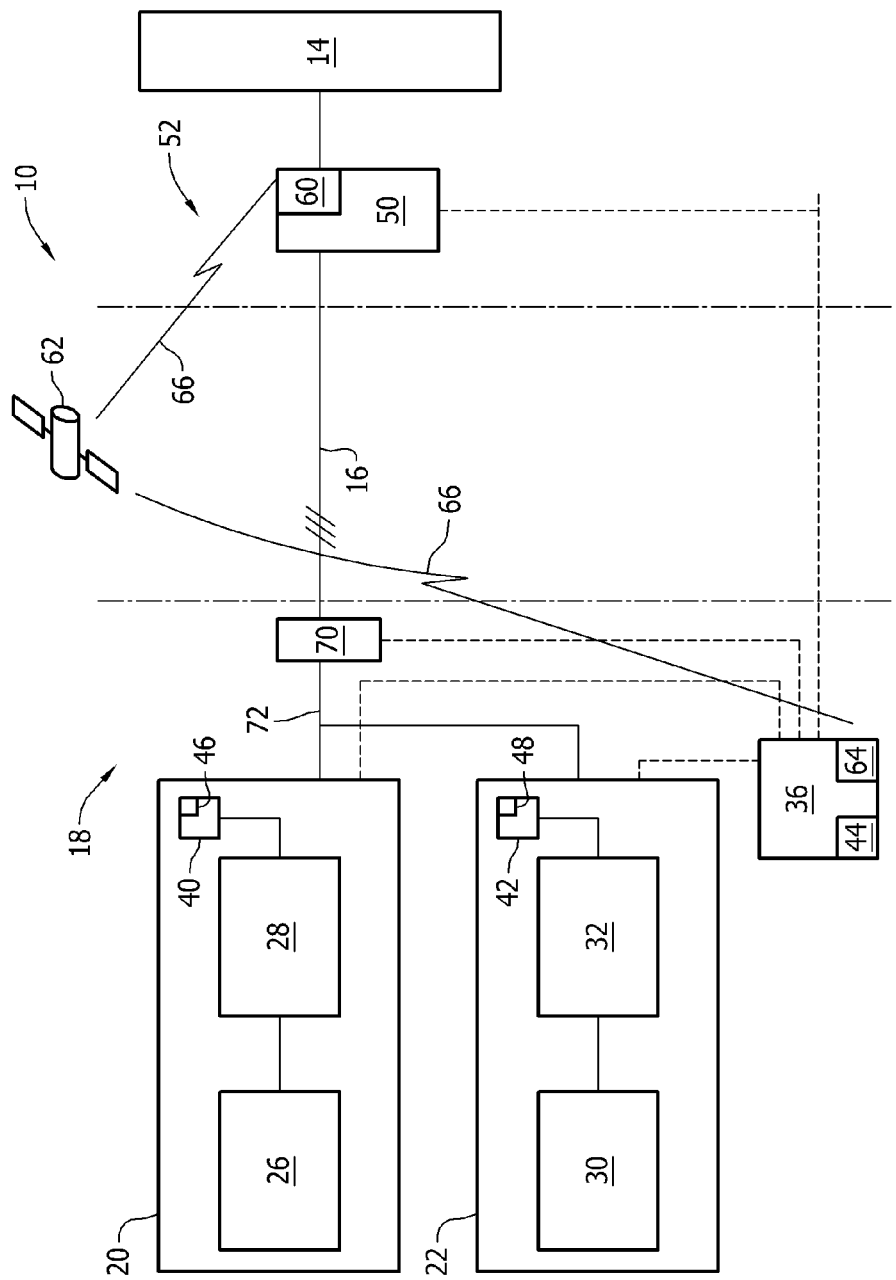
FIG. 1 is a block diagram of an exemplary power delivery system that includes a power generation system coupled to an electrical grid.

FIG. 1 is a block diagram of an exemplary power delivery system 10 that includes at least one renewable energy-based power generation system coupled to an electrical grid 14 by at least one conductor 16. In the illustrative embodiment, the at least one conductor 16 comprises at least one transmission line capable of electrically coupling a power generation system located a substantial distance from electrical grid 14. Wind farms and solar farms that produce high power levels typically require a substantial amount of open space. Available space, and locations with high levels of wind/solar exposure, may be hundreds of miles from load centers coupled to electrical grid 14. Although described as a transmission line, the at least one conductor 16 may comprise at least one distribution line or any other conductor or group of conductors able to electrically couple the power generation system to electrical grid 14. Furthermore, power deliver system 10 may include a transmission system, a distribution system, and/or any other suitable type of system that facilitates delivering power to an electrical grid.

In the illustrative embodiment, a source side 18 of transmission line 16 includes a first power generation system 20 and a second power generation system 22. Although described as including two power generation systems, source side 18 of transmission line 16 may include any number of power generation systems that allows power delivery system 10 to function as described herein. Furthermore, when first and second power generation systems 20 and 22 are wind energy based power generation systems, source side 18 may be referred to as a wind farm. Moreover, when first and second power generation systems 20 and 22 are solar energy based power generation systems, source side 18 may be referred to as a solar farm.

In the illustrative embodiment, first power generation system 20 includes a power source 26 and a power converter 28. Second power generation system 22 includes a power source 30 and a power converter 32. For example, when source side 18 is a wind farm, power source 26 may include a wind turbine. Power converter 28 may include an alternating current (AC) to direct current (DC) converter and a DC to AC converter for converting a variable frequency output of a wind turbine to a fixed frequency output. In another example, when source side 18 is a solar farm, power source 26 may include a photovoltaic (PV) array and power converter 28 may include a solar converter. PV arrays typically output a DC voltage. The solar converter may include an inverter that receives the DC voltage and converts it to a three-phase AC output that is applied to a load, for example, electrical grid 14. Although described as a solar farm or a wind farm, power source 26 may be any type of converter-connected power source.

As referred to herein, electrical grid 14 is a network of conductors and devices configured for distribution and/or transmission of electricity. In the illustrative embodiment, source side 18 also includes a central system controller 36. System controller 36 is communicatively coupled to first power generation and conversion system 20 and second power generation and conversion system 22. In the illustrative embodiment, central system controller 36 provides control signals to power converters 28 and 32 that control a power output of systems 20 and 22, respectively. System controller 36 is a centralized controller that coordinates operation of systems 20 and 22 to output a desired power to transmission line 16. For example, system controller 36 may be included within a wind farm management system and configured to coordinate operation of the wind turbines and power converters included within the wind farm. In an alternative embodiment, system 20 may include a converter controller 40 and system 22 may include a converter controller 42. Converter controller 40 controls operation of power converter 28 and/or power source 26 either autonomously or based on control signals received from central system controller 36. Converter controller 42 controls operation of power converter 32 and/or power source 30 either autonomously or based on control signals received from central system controller 36.

In the illustrative embodiment, controllers 36, 40, and 42 each include a processor, for example, processors 44, 46, and 48, respectively. The term processor, as used herein, refers to central processing units, microprocessors, microcontrollers, reduced instruction set circuits (RISC), application specific integrated circuits (ASIC), logic circuits, and any other circuit or processor capable of executing the functions described herein.

In the illustrative embodiment, power delivery system 10 also includes a phasor measurement unit (PMU) 50. In the illustrative embodiment, PMU 50 is positioned on a grid side 52 of transmission line 16, which is remote from source side 18. PMU 50 measures voltage and current at grid side 52 and outputs a phasor of the measured grid voltage and current. In the illustrative embodiment, PMU 50 is communicatively coupled to system controller 36. In an alternative embodiment, PMU 50 is communicatively coupled to converter controllers 40 and 42. PMU 50 may be coupled to any combination of controllers 36, 40, and 42 that allows system 10 to function as described herein.

For example, PMU 50 may be communicatively coupled to system controller 36 via fiber optic cable and/or any other type of wired connection that allows system 10 to function as described herein. In an alternative embodiment, PMU 50 may be communicatively coupled to system controller 36 via a wireless connection. The wireless communication may include, but is not limited to, cellular communication, satellite communication, radio frequency (RF) communication, communication utilizing an Institute of Electrical and Electronics Engineers (IEEE) 802.11 standard (e.g., 802.11(g) or 802.11(n)), communication utilizing a Worldwide Interoperability for Microwave Access (WIMAX) standard, and/or any wireless communication that allows PMU 50 to function as described herein.

In the illustrative embodiment, PMU 50 includes, or is coupled to, a first global positioning system (GPS) receiver 60 configured to receive temporal information, for example, from a satellite 62. For example, GPS receiver 60 may receive a signal corresponding to the Coordinated Universal Time (UTC). Temporal information may also be referred to herein as a "time-stamp." First GPS receiver 60 is coupled to, or included within, PMU 50. A time-stamp is collected, stored, and/or transmitted with a corresponding piece of information. For example, a time-stamp may be stored with phasor information to record a time that the phasor information was collected. The time-stamp may also be transmitted, with the corresponding phasor information, to system controller 36 for use by system controller 36. In the illustrative embodiment, system controller 36 receives time-stamped voltage phasor values. Determining the temporal information from a GPS signal facilitates obtaining coordinated time-stamps at distributed locations.

In the illustrative embodiment, system controller 36 includes, or is coupled to, a second GPS receiver 64. Second GPS receiver 64 is configured to receive GPS signal 66 that includes location and temporal information, for example, from satellite 62. In an alternative embodiment, converter controllers 40 and 42 also include GPS receivers.

In the illustrative embodiment, phasor data received at system controller 36 from remote PMU 50 allows systems 20 and 22 to maintain synchronization with grid 14 even under low-voltage fault events and/or zero-voltage fault events. Maintaining synchronization with grid 14 facilitates keeping systems 20 and 22 online (i.e., ride-through) for at least a certain amount of time during grid fault events. The ability to ride-through a grid fault event may be included within grid integration requirements set forth by an operator of grid 14. Controller 36 is able to synchronize with grid 14, using phasor data from PMU 50, even when a grid event is severe enough that system controller 36 cannot obtain a reference residual grid voltage. When the fault is cleared and connection between systems 20 and 22 and grid 14 is re-established, the output of systems 20 and 22 are synchronized with grid 14, which prevents a detrimentally large current from being generated due to the large phase angle difference between the two sides.

Furthermore, in the illustrative embodiment, receiving data from remote PMU 50 allows controller 36 to mitigate dynamics caused by a sudden phase jump. For example, when a large capacitor-bank that is coupled to grid 14 is switched on or off, or when a load is connected or disconnected from grid 14, the voltage phase angle at grid side 52 may jump and result in a large dynamic between the output of systems 20 and 22 and grid 14 (e.g., big power swing). Phasor data received from PMU 50 is provided to system controller 36 as a feedforward input signal and system controller 36 adjusts a phase angle of voltage output by systems 20 and/or 22 to cancel out the effect and render a smoother power output.

In the illustrative embodiment, system 10 includes at least one measurement device 70 coupled to, or included within, system controller 36 and configured to provide voltage and/or current measurements from an output 72 of systems 20 and 22. Measurement device 70 may provide measurements to system controller 36 from which a power output of systems 20 and 22 can be determined. In the illustrative embodiment, system controller 36 combines data from remote PMU 50 (e.g., phasor data) and local measurement from measurement device 70 to determine a line impedance of transmission line 16. More specifically, system controller 36 determines the line impedance based on the power output of source side 18, a magnitude and phase angle of voltage output by source side 18, and a magnitude and phase angle of voltage at grid side 52. Furthermore, system controller 36 can determine if a thermal limit of transmission line 16 is being approached by comparing the line impedance to a temperature of transmission line 16 (i.e., the line impedance rises in proportion to its temperature). Moreover, system controller 36 can identify a high impedance fault on transmission line 16, which is observed by system controller 36 as a sudden change in line impedance.

System controller 36 may determine the line impedance based on the following formula:

$$P \approx \left(\frac{v1 * v2}{x}\right) * \sin(\alpha 1 - \alpha 2) \qquad \text{Formula 1}$$

Power provided to transmission line 16 is represented in Formula 1 as P. As described above, controller 36 determines P based on measurements received from measurement device 70. Furthermore, a magnitude of the voltage provided to transmission line 16 is represented in Formula 1 as v1 and a phase angle of the voltage provided to transmission line 16 is represented as $\alpha 1$. In the illustrative embodiment, v1 and $\alpha 1$ are provided to controller 36 by measurement device 70. A magnitude of the voltage at grid side 52 of transmission line 16 is represented in Formula 1 as v2 and a phase angle of the voltage at grid side 52 of transmission line 16 is represented as $\alpha 2$. V2 and $\alpha 2$ are provided to controller 36 by PMU 50. The remaining variable, x, is the line impedance of transmission line 16.

Moreover, once the line impedance is known, controller 36 may determine a maximum level of power that grid 14 is able to accept. In the case of a wind farm (i.e., power source 26 is a wind turbine), if the power transfer capability of the grid connection is reduced to lower than the available wind power (i.e., due to a fault-induced low voltage event), converter 28 will attempt to increase its power output to match the wind power by continuously increasing its voltage phase leading against the grid. Increasing the voltage phase may eventually result in instability, for example, similar to "out-of-step operation" of a traditional synchronous generator. Receiving phasor data from remote PMU 50 can help assure system angle stability. Under certain system events when the grid voltage undergoes prolonged sag, the farm generator may face an angle stability issue because it is trying to push more power over the transmission line than grid side 52 is able to accept. Knowing the actual grid voltage allows the farm controller to adaptively limit its output power level and avoid such an angle stability issue.

Figure 2:
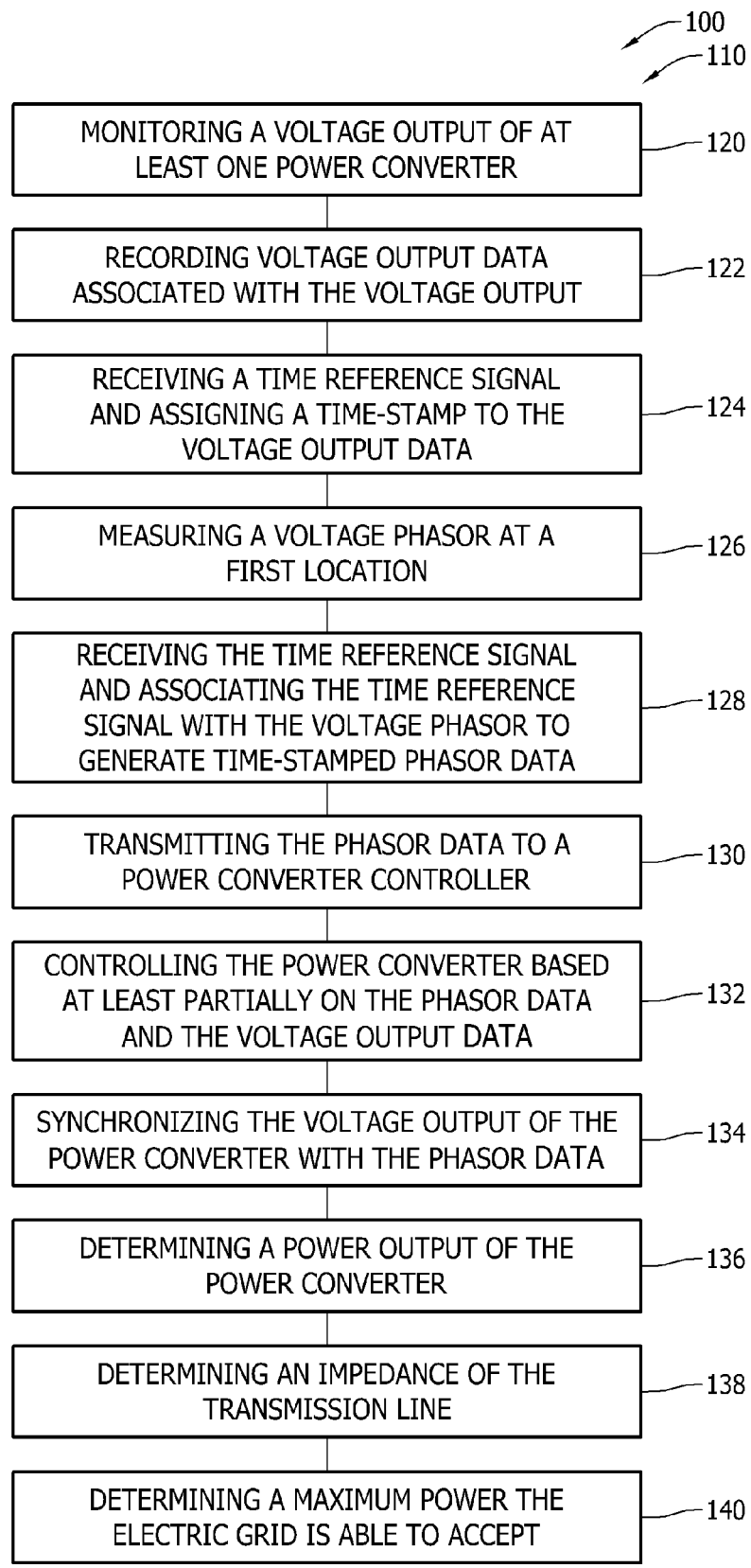
FIG. 2 is a flow chart of an exemplary method for controlling the power generation system shown in FIG. 1.

FIG. 2 is a flow chart 100 of an exemplary method 110 for controlling at least one power converter, for example, power converters 28 and/or 32 (shown in FIG. 1). More specifically, flow chart 100 illustrates an exemplary method 110 for controlling a power output of power generation systems 20 and/or 22 based at least partially on phasor data received from a PMU, for example, PMU 50 (shown in FIG. 1). In an illustrative embodiment, method 110 is a computer-implemented method, for example, a computer-implemented method executed by controller 36 (shown in FIG. 1). In another illustrative embodiment, a computer program embodied on a computer readable medium includes at least one code segment, that when executed by a computer, for example, system controller 36, performs method 110.

As described above, power converters 28 and 32 provide power to an electrical grid, for example, electrical grid 14 (shown in FIG. 1) through a transmission line, for example, transmission line 16 (shown in FIG. 1). Furthermore, transmission line 16 includes a first end, for example, at source side 18 (shown in FIG. 1), and a second end, for example, at grid side 52 (shown in FIG. 1).

In the illustrative embodiment, method 110 includes monitoring 120 a voltage output of at least one power converter, for example, power converter 28 and/or power converter 32. For example, a measurement device, for example, measurement device 70 (shown in FIG. 1), may monitor 120 the voltage output of power converters 28 and/or 32.

In the illustrative embodiment, method 110 may also include recording 122 voltage output data associated with the voltage output of power converters 28 and/or 32. Method 110 may also include receiving 124 a global time reference signal and assigning a time-stamp to the voltage output data. System controller 36 (shown in FIG. 1) may include a GPS receiver, for example, GPS receiver 64 (shown in FIG. 1), configured to receive 124 a GPS signal that includes time reference data.

In the illustrative embodiment, method 110 also includes measuring 126 a voltage phasor at a first location, for example, at grid side 52 of transmission line 16. A PMU, for example, PMU 50 (shown in FIG. 1) may be positioned at grid side 52 to measure 126 a voltage phasor at grid side 52 of transmission line 16. Method 110 also includes receiving 128 the time reference signal and associating the time reference signal with the voltage phasor to generate time-stamped phasor data. In the illustrative embodiment, method 110 also includes transmitting 130 the phasor data to a power converter controller, for example, controller 36.

For example, PMU 50 may transmit 130 the phasor data to central controller 36. In an alternative embodiment, PMU 50 transmits 130 the phasor data to individual power converter controllers, for example, power converter controllers 40 and/or 42 (shown in FIG. 1). Method 110 also includes controlling 132 power converters 28 and/or 32 based at least partially on the phasor data and the voltage output data.

Method 110 may also include synchronizing 134 the voltage output of power converters 28 and/or 32 with the phasor data. Synchronizing 134 may include controlling power converters 28 and/or 32 to output a voltage having an angle that is in phase with the voltage measured at grid side 52 of transmission line 16.

Method 110 may also include determining 136 a power output of power converters 28 and/or 32 and determining 138 an impedance of transmission line 16 based at least partially on the power output and the phasor data. Controller 36 may determine 138 the impedance of transmission line 16 based at least partially on data received from PMU 50 and data received from a local power measurement device, for example, measurement device 70 (shown in FIG. 1). More specifically, controller 36 may determine 138 the impedance (X) of transmission line 16 based on:

$$P \approx \left(\frac{v1 * v2}{x}\right) * \sin(\alpha1 - \alpha2)$$

Method 110 may also include determining 140 a maximum power that grid 14 is able to accept based at least partially on the impedance of transmission line 16.

It should be noted that embodiments described herein are not limited to any particular processor for performing the processing tasks of the invention. The term "processor," as that term is used herein, is intended to denote any machine capable of performing the calculations, or computations, necessary to perform the tasks of the invention. The term "processor" also is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of embodiments of the invention, as will be understood by those skilled in the art.

Furthermore, unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

Embodiments described herein may embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

Described herein are illustrative methods, systems, and computer readable media for controlling operation of a power converter based at least partially on remote power data obtained by a PMU. By receiving the grid PMU measurements, for example, voltage phase angle, and synchronizing a local phase lock loop (PLL), a renewable generator controller is able to acquire important information of the grid connection. For example, by evaluating power versus phase angle the controller can determine grid strength. Also, a phase jump or voltage drop detected from the PMU measurements provide the controller with an indication of a grid fault event. The PMU information allows the controller to adaptively adjust control parameters to optimize the dynamic response of the power generation system according to actual grid conditions. The PMU information also improves the systems ability to ride through a grid fault event and maintain synchronization with the grid for improved recovery from the grid fault event.

The methods, systems, and computer readable media described herein facilitate efficient and economical control of a power generation system. Illustrative embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power delivery system comprising:
   at least one conductor having a first end and a second end;
   a phasor measurement unit (PMU) coupled to said first end of said at least one conductor, said PMU configured to obtain phasor data at said first end and generate a phasor signal that includes the phasor data; [[and]]
   a power generation system coupled to said second end of said at least one conductor and configured to provide power to said at least one conductor, said power generation system comprising a power source, a power converter, and a controller, wherein said controller is communicatively coupled to said PMU and is configured to receive the phasor signal and control said power converter based at least partially on the phasor data;
   a measurement device communicatively coupled to said controller and configured to:
     measure at least one of a voltage and a current at said second end of said at least one conductor;
     generate an output power signal that includes converter output data representing at least one of the voltage and the current measured at said second end of said at least one conductor;
   wherein said controller is configured to:
     determine an impedance (X) of said at least one conductor based on the converter output data and the phasor data; and
     determine a maximum power an electrical grid is able to accept based at least partially on the impedance of said at least one conductor.

2. A power delivery system in accordance with claim 1, wherein said at least one conductor comprises at least one transmission line configured to at least one of transmit and distribute power from said power generation system to the electrical grid.

3. A power delivery system in accordance with claim 1, wherein said controller is configured to maintain phase synchronization between said power generation system and the electrical grid during a low voltage ride through event and/or a zero voltage ride through event by applying the phasor data to said controller operation.

4. A power delivery system in accordance with claim 1, wherein said power source comprises at least one of a wind turbine generator and a photovoltaic array.

5. A power delivery system in accordance with claim 1, wherein said controller comprises at least one of a central system controller and an individual converter controller.

6. A power delivery system in accordance with claim 1, wherein said PMU comprises a global positioning system (GPS) receiver that receives a time reference signal used to time-stamp the phasor data.

7. A power delivery system in accordance with claim 6, wherein the phasor data comprises at least one of a time-stamped current phasor and a time-stamped voltage phasor associated with power at said first end of said at least one conductor.

8. A power delivery system in accordance with claim 7, wherein said controller comprises a GPS receiver that receives the time reference signal, said controller uses the time-stamped phasor data as at least one of a voltage reference and a current reference for controlling said power converter.

9. A power delivery system in accordance with claim 7, wherein said controller controls said power converter to output power that is in phase with the power at said first end of said at least one conductor.

10. A power delivery system in accordance with claim 1, wherein said controller controls said power converter to output power that is less than the maximum power the electrical grid is able to accept.

11. A method for controlling at least one power converter configured to provide power to an electrical grid through a transmission line, said method comprising:
   monitoring a voltage output of the at least one power converter;
   recording a voltage output data associated with the voltage output;
   receiving a time reference signal and assigning a timestamp to the voltage output data;
   measuring a voltage phasor at a first location located at an opposite end of the transmission line from the at least one power converter;
   receiving the time reference signal and associating the time reference signal with the voltage phasor to generate phasor data;
   transmitting the phasor data to a power converter controller;
   controlling, using the power converter controller, the at least one power converter based at least partially on the phasor data and the voltage output data;
   determining a power output of the at least one power converter;
   determining an impedance of the transmission line based at least partially on the power output and the phasor data; and
   determining a maximum power the electrical grid is able to accept based at least partially on the impedance of the transmission line.

12. A method in accordance with claim 11, further comprising synchronizing the voltage output of the at least one power converter with the phasor data.

13. A method in accordance with claim 12, wherein synchronizing the voltage output of the at least one power converter with the phasor data comprises controlling the at least one power converter to output a voltage having a frequency that is in phase with the voltage measured at the first location.

14. A controller configured to control a power converter coupled to a transmission line having a first end and a second end, said controller comprising:
- a global positioning device (GPS) receiver configured to receive a time reference signal;
- a memory device configured to store voltage output data associated with a voltage output of the power converter, wherein the voltage output data includes voltage output data measured at the first end of the transmission line at a first time; and
- a processing device configured to:
  - assign a time reference to the voltage output data stored in said memory device;
  - receive phasor data from a phasor measurement unit (PMU) positioned at the second end of the transmission line, wherein the phasor data includes a time reference tying the phasor data to the first time;
  - compare the phasor data from the first time to the voltage output data from the first time;
  - control operation of the power converter based at least partially on the phasor data and the voltage output data;
  - determine a power output of the power converter;
  - determine an impedance of the transmission line based at least partially on the power output of the power converter and the phasor data; and
  - determine a maximum power that said electrical grid is able to accept based at least partially on the impedance of the transmission line.

* * * * *

UNITED STATES PATENT AND TRADEMARK OFFICE
CERTIFICATE OF CORRECTION

PATENT NO. : 8,942,856 B2  
APPLICATION NO. : 13/334383  
DATED : January 27, 2015  
INVENTOR(S) : Ren et al.

Page 1 of 1

It is certified that error appears in the above-identified patent and that said Letters Patent is hereby corrected as shown below:

On the Title Page, in item (56), under "OTHER PUBLICATIONS", in Column 2, Line 1, delete "et al, Snychrophasor-Based" and insert -- et al., Synchrophasor-Based --, therefor.

In the Specification  
In Column 9, Line 5, delete "systems" and insert -- system's --, therefor.

In the Claims  
In Column 9, Line 37, in Claim 1, delete "[[and]]".

In Column 11, Line 1, in Claim 13, delete "a frequency" and insert -- an angle --, therefor.

Signed and Sealed this  
Twelfth Day of May, 2015

Michelle K. Lee  
*Director of the United States Patent and Trademark Office*